US012266890B2

(12) United States Patent
Kozono et al.

(10) Patent No.: US 12,266,890 B2
(45) Date of Patent: Apr. 1, 2025

(54) CONNECTOR FITTING STRUCTURE

(71) Applicant: Yazaki Corporation, Tokyo (JP)

(72) Inventors: Seiji Kozono, Kakegawa (JP); Yoshitaka Tsushima, Fujieda (JP); Masaya Okamoto, Fujieda (JP)

(73) Assignee: YAZAKI CORPORATION, Tokyo (JP)

(*) Notice: Subject to any disclaimer, the term of this patent is extended or adjusted under 35 U.S.C. 154(b) by 378 days.

(21) Appl. No.: 17/852,885

(22) Filed: Jun. 29, 2022

(65) Prior Publication Data

US 2023/0006395 A1 Jan. 5, 2023

(30) Foreign Application Priority Data

Jul. 5, 2021 (JP) ................................ 2021-111755

(51) Int. Cl.
*H01R 13/631* (2006.01)

(52) U.S. Cl.
CPC .................................. *H01R 13/631* (2013.01)

(58) Field of Classification Search
CPC .................................................... H01R 13/631
USPC ........................................................... 439/157
See application file for complete search history.

(56) References Cited

U.S. PATENT DOCUMENTS 7,530,830 B1 * 5/2009 Lenox ................ H01R 13/5219 439/248
2001/0027049 A1 10/2001 Kato et al.
2010/0178789 A1 * 7/2010 Ohmori .............. H01R 13/6315 439/345
2014/0357114 A1 * 12/2014 Pankau .............. H01R 13/6272 439/372
2017/0062978 A1 * 3/2017 Seido ................. H01R 13/5219
2018/0323541 A1 * 11/2018 Seido ............... H01R 13/62922
2021/0167551 A1 * 6/2021 He ....................... H01R 13/516

FOREIGN PATENT DOCUMENTS

DE 202015003177 U1 * 6/2015 ......... H01R 13/6315
JP 2001244020 A 9/2001
JP 2013045521 A 3/2013
JP 201624952 A 2/2016
JP 2016024952 A * 2/2016
JP 6200862 B2 * 9/2017
JP 6516144 B2 * 5/2019
WO WO-2008034134 A2 * 3/2008 ........... H01R 13/641

* cited by examiner

*Primary Examiner* — Peter G Leigh
(74) *Attorney, Agent, or Firm* — Sughrue Mion, PLLC

(57) ABSTRACT

A connector fitting structure including: a first connector; and a second connector. The first connector includes a guide groove provided in a first housing. The guide groove includes: a first groove portion extending along a connector fitting direction; a second groove portion formed to gradually increase in width from a side of the first groove portion toward a side of the second connector; and a connection portion that connects the first groove portion and the second groove portion. The second connector includes a projection portion provided on a second housing and inserted into the guide groove. The projection portion has a recessed portion formed on a front end side of the projection portion and on at least one side surface of the projection portion that faces groove side surfaces of the guide groove.

10 Claims, 7 Drawing Sheets

CONNECTOR FITTING STRUCTURE

CROSS-REFERENCE TO RELATED APPLICATIONS

This application is based on and claims priority under 35 USC 119 from Japanese Patent Application No. 2021-111755 filed on Jul. 5, 2021, the contents of which are incorporated herein by reference.

TECHNICAL FIELD

The present disclosure relates to a connector fitting structure.

BACKGROUND ART

In the related art, a wire harness (electric wire) for electrically connecting various electrical components mounted on an automobile and the like performs connection by a connector. In order to fit such a connector well, it is conceivable to apply, for example, a connector guide mechanism described in JP2016-024952A.

The connector guide mechanism includes a plug, a socket, a plug-side guide, and a socket-side guide. The plug-side guide and the socket-side guide include a positioning portion that aligns the plug and a front end portion of the plug-side guide with predetermined positions in a direction around an axis when the plug is inserted into the socket. The positioning portion includes a protruding portion formed at the front end portion of the plug-side guide, and a groove formed in an opening portion of the socket-side guide such that the protruding, portion is inserted into the opening portion. According to this configuration, since the plug and the front end portion of the plug-side guide are restricted in a normal direction by the positioning portion, even when a central axis direction of the plug and a central axis direction of the socket are in an inclined relationship, the plug can be inserted and removed well.

In the connector guide mechanism disclosed in JP2016-024952A, in a plan view, the groove has a rectangular shape extending in a fitting direction, and the protruding portion has a rectangular shape corresponding to the groove. Therefore, in the connector guide mechanism, although an inlet side of the groove is widened, depending on an insertion angle at the time of plug insertion, the protruding portion may be caught by a groove wall surface in the vicinity of the inlet of the groove and the plug may not be smoothly fitted.

SUMMARY OF INVENTION

The present disclosure provides a connector fitting structure capable of smoothly inserting and fitting a connector.

According to an illustrative aspect of the present disclosure, a connector fitting structure includes: a first connector; and a second connector, in which the first connector and the second connector are fitted and electrically connected to each other. The first connector includes: a first housing that houses a first connection terminal; and a guide groove provided in the first housing. The guide groove includes: a first groove portion extending along a connector fitting direction; a second groove portion formed to gradually increase in width from a side of the first groove portion toward a side of the second connector; and a connection portion that connects the first groove portion and the second groove portion. The second connector includes: a second housing that houses a second connection terminal; and a projection portion provided on the second housing and inserted into the guide groove. The projection portion has a recessed portion formed on a front end side of the projection portion and on at least one side surface of the projection portion that faces groove side surfaces of the guide groove.

The present disclosure has been briefly described above. Details of the present disclosure will be further clarified by reading through an embodiment for implementing the invention described below (hereinafter referred to as the "embodiment") with reference to the accompanying drawings.

DESCRIPTION OF EMBODIMENTS

Hereinafter, an example of an embodiment according to the present disclosure will be described with reference to the drawings.

Figure 1:
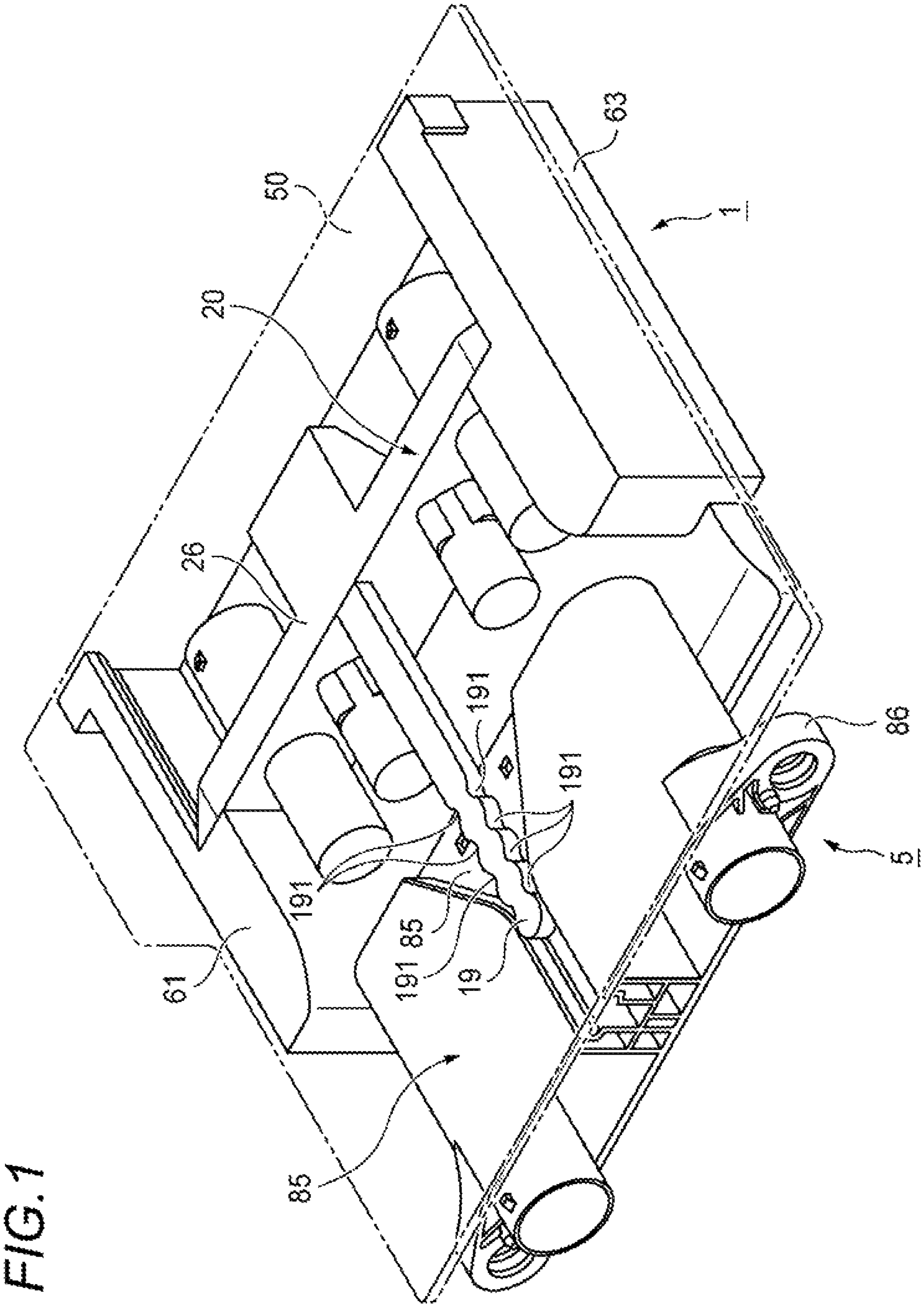
FIG. 1 is a perspective view showing an inlet as a second connector and an inlet plug as a first connector to be fitted to the inlet, which constitute a connector fitting structure according to an embodiment of the present disclosure.
Figure 2:
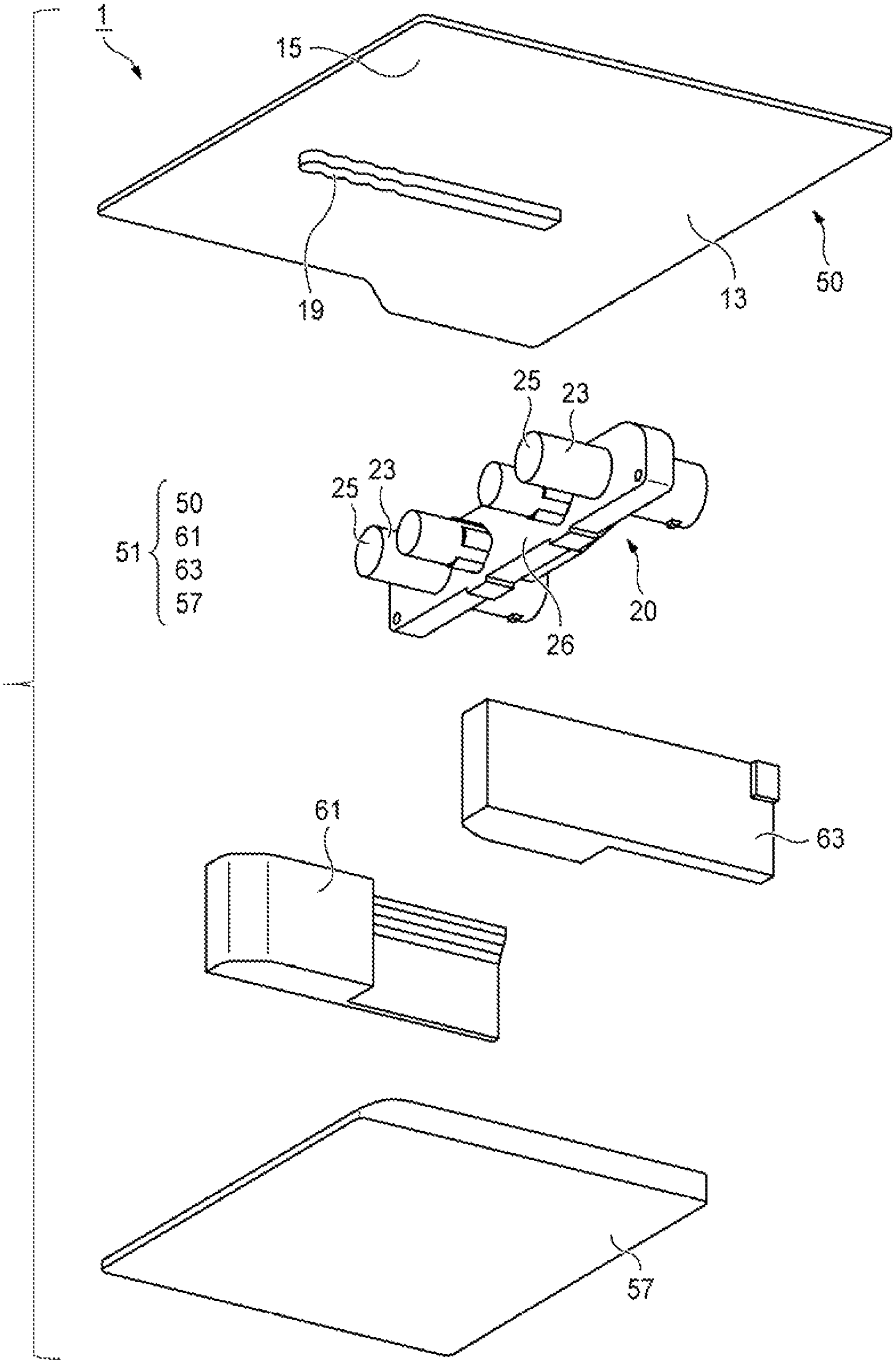
FIG. 2 is an exploded perspective view of the inlet shown in FIG. 1.
Figure 3:
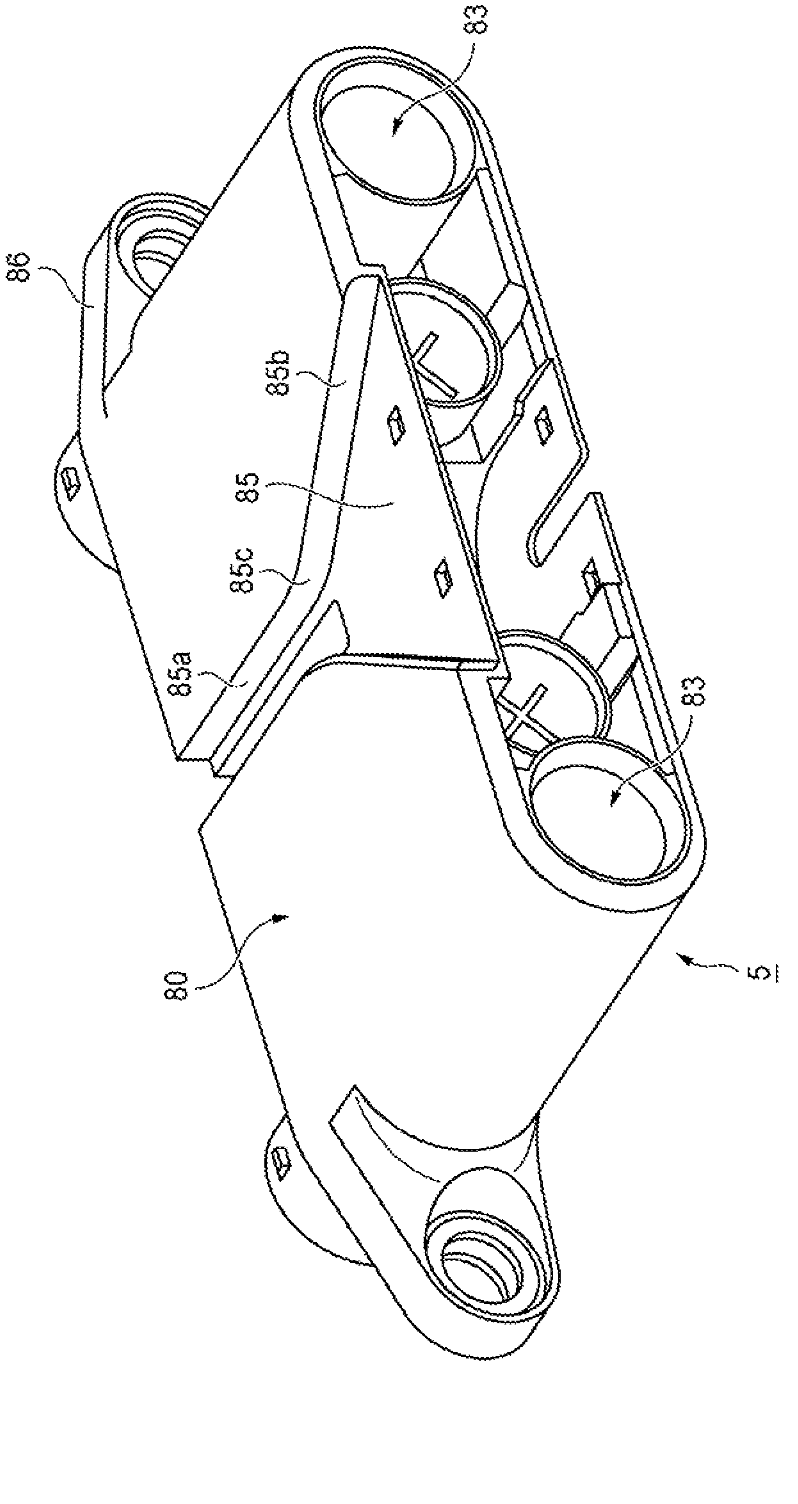
FIG. 3 is a perspective view of the inlet plug shown in FIG. 1.

FIG. 1 is a perspective view showing an inlet 1 as a second connector and an inlet plug 5 as a first connector to be fitted to the inlet 1, which constitute a connector fitting structure according to the embodiment of the present disclosure. FIG. 2 is an exploded perspective view of the inlet 1 shown in FIG. 1. FIG. 3 is a perspective view of the inlet plug 5 shown in FIG. 1.

As shown in FIGS. 1 and 2, the inlet 1, which is the second connector according to the present embodiment, includes a housing 20 that houses a connection terminal (second connection terminal), an outer case 51 as a second housing that houses and holds the housing 20, and a pick-up rib 19 as a projection portion that is provided on the outer case 51 and is inserted into a fitting guide groove 85 (guide groove). In the pick-up rib 19, a plurality of recessed portions 191 are formed on front end sides of both side surfaces facing groove side surfaces of the fitting guide groove 85. The fitting guide groove 85 is provided in a plug housing 80 of the inlet plug 5.

In the present specification, a front-rear direction is a direction along a connector fitting direction (a left-right direction in FIGS. 6A and 6B) of the housing 20. A side where the plug housing 80 of the inlet plug 5 is fitted is defined as the front side. An upper-lower direction is a direction (an upper-lower direction in FIGS. 6A and 6B) orthogonal to the connector fitting direction of the housing 20. A top plate 50 side of the outer case 51 is defined as the upper side.

The housing 20 of the inlet 1 is formed of an electrically insulating synthetic resin. A front wall 26 of the housing 20 is provided with a pair of terminal housing cylinder portions 23, 23 protruding toward the inlet plug 5 side.

A connection terminal connected to a terminal portion of a high-voltage cable (not shown) is housed in the terminal housing cylinder portion 23. The high-voltage cable connected to the connection terminal is drawn out from a rear end opening of the terminal housing cylinder portion 23.

A front surface opening 25 into which a connection terminal (first connection terminal) of the inlet plug 5 is inserted is formed at a front end of the terminal housing cylinder portion 23.

The connection terminal is a female terminal formed of a conductive metal material, and is formed in a cylindrical rod shape. A joint hole is formed in a rear end portion of the connection terminal and a conductor of the high-voltage cable drawn out from the rear end opening of the terminal housing cylinder portion 23 is inserted into the joint hole and is crimped and connected to the joint hole.

As shown in FIG. 2, the outer case 51 is a flat housing formed by a bottom plate portion 57, side wall members 61, 63, and the top plate 50.

The bottom plate portion 57 is a flat plate having a size slightly smaller than the top plate 50. The bottom plate portion 57 has an inclined portion, which guides the insertion of the inlet plug 5 into the inlet 1, on an upper surface of a front side end portion.

The side wall members 61, 63 are disposed on both left and right sides of the housing 20, and serve as both side walls of the outer case 51. Each of the side wall members 61, 63 has a step portion at a substantially central position in the front-rear direction, with which both side end portions of the housing 20 are brought into contact.

In the top plate 50, an eaves portion 15 extends in front of an upper wall portion 13 that defines a housing space together with the bottom plate portion 57 and the side wall members 61, 63.

On a lower surface at a central portion of the eaves portion 15, the pick-up rib 19 for guiding and fitting the plug housing 80 of the inlet plug 5 to the housing 20 housed in the outer case 51 extends along the connector fitting direction.

The pick-up rib 19 has a substantially rectangular parallelepiped shape whose front end is rounded and whose length in the connector fitting direction is longer than the length in the left-right direction, and the plurality of recessed portions 191 are formed on both left and right side surfaces in a front side (front end side). The plurality of recessed portions 191 are formed in the pick-up rib 19 at predetermined intervals along the connector fitting direction from a front end of the pick-up rib 19. The predetermined interval is appropriately determined in consideration of a size of the pick-up rib 19, a size of the fitting guide groove 85, and the like. The recessed portions 191 have a sine wave shape in which a cross section in a plane along a groove bottom surface of the fitting guide groove 85 is a curved shape. The cross-sectional shape of the recessed portions 191 is the same as the shape of the recessed portions 191 in a plan view shown in FIG. 8. Both the left and right side surfaces of the pick-up rib 19 face the groove side surfaces of the fitting guide groove 85 provided in the plug housing 80 of the inlet plug 5. On the front end side of the pick-up rib 19, the plurality of recessed portions 191 are provided on both the left and right side surfaces, such that a cross-sectional shape in a plane along the groove bottom surface of the fitting guide groove 85 is a circular connection shape in which a plurality of circles are connected.

The top plate 50, the pick-up rib 19, the side wall members 61, 63, and the bottom plate portion 57 are integrally formed of an electrically insulating synthetic resin. The housing 20 housing the connection terminal is inserted into the integrally molded outer case 51 from the rear side and screwed.

The inlet plug 5 serving as the first connector according to the present embodiment includes a plug-side connection terminal to be fitted to the connection terminal of the inlet 1, the plug housing 80 serving as a first housing having a pair of terminal housing chambers 83, 83 for housing the plug-side connection terminal, and a bracket 86 (see FIGS. 1 and 3).

The plug housing 80 is formed of an electrically insulating synthetic resin. The bracket 86 is attached to the plug housing 80.

The fitting guide groove 85 is formed in the upper surface of the plug housing 80. The fitting guide groove 85 includes a first groove portion 85*a* extending along the connector fitting direction, a second groove portion 85*b* formed to be gradually increase in width from the first groove portion 85*a* side toward the inlet 1 side (in other words, formed to expand obliquely outward in a width direction), and a connection portion 85*c* connecting the first groove portion 85*a* and the second groove portion 85*b*. The first groove portion 85*a* has a width corresponding to a width of the pick-up rib 19 provided on the top plate 50 of the inlet 1. The fitting guide groove 85 has a substantially Y-shaped profile in a plan view. When the inlet plug 5 is fitted to the inlet 1, the fitting guide groove 85 is engaged with the pick-up rib 19, such that the plug housing 80 can be fitted and guided to the housing 20.

A connection terminal 90 (see FIGS. 6A and 6B) connected to a terminal portion of a plug-side high-voltage cable (not shown) is housed in the terminal housing chamber 83. The plug-side high-voltage cable connected to the connection terminal 90 is drawn out from a rear end opening of the terminal housing chamber 83.

Figure 6A:
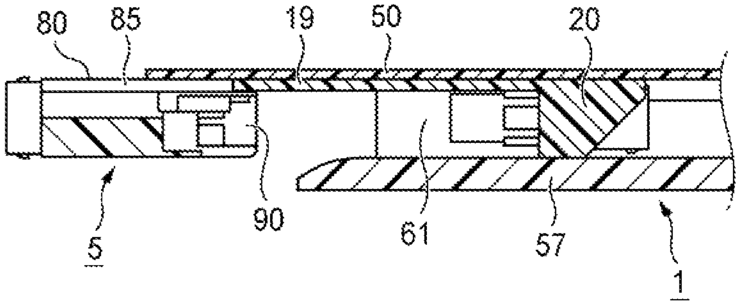
FIG. 6A is a cross-sectional view taken along line A-A in FIG. 4.
Figure 6B:
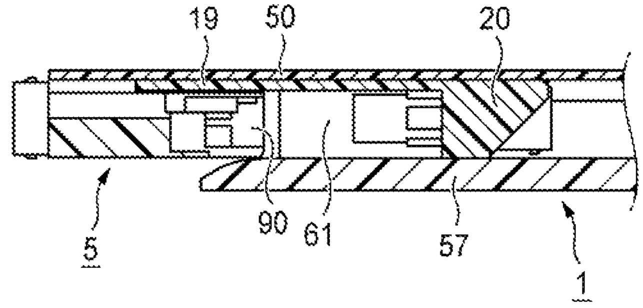
FIG. 6B is a cross-sectional view taken along line B-B in FIG. 5.

The connection terminal 90 shown in FIGS. 6A and 6B is a male terminal formed of a conductive metal material, and is formed in a columnar rod shape. A joint hole is formed in a rear end portion of the connection terminal 90, and a conductor of the high-voltage cable drawn out from the rear end opening of the terminal housing chamber 83 is inserted into the joint hole and is crimped and connected to the joint hole.

Next, a fitting operation of the inlet 1 and the inlet plug 5 will be described with reference to FIGS. 4 to 9.

From a state in which the inlet plug 5 and the inlet 1 face each other, the inlet plug 5 is moved to the inlet 1 side, and the plug housing 80 starts to be inserted and fitted into the outer case 51. In a stale immediately after the start of fitting, as shown in FIGS. 4 and 6A, the upper surface of the plug housing 80 abuts on a lower surface of the top plate 50 of the inlet 1, and the front end of the pick-up rib 19 is inserted into the second groove portion 85*b* of the fitting guide groove 85.

Figure 4:
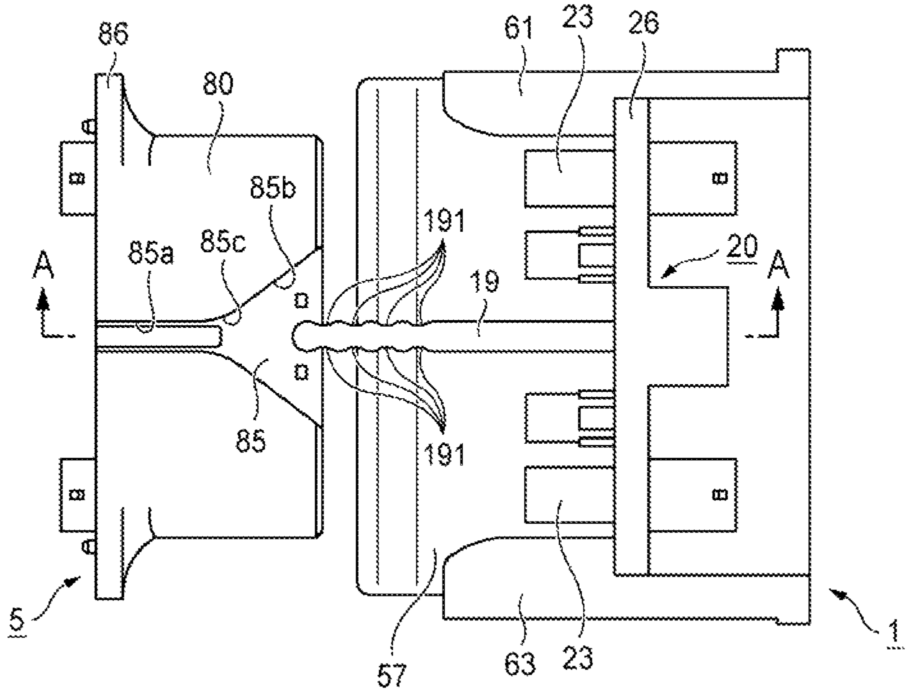
FIG. 4 is a plan view in which a top plate of the inlet is omitted in a state immediately after the inlet and the inlet plug shown in FIG. 1 start to be fitted to each other.
Figure 5:
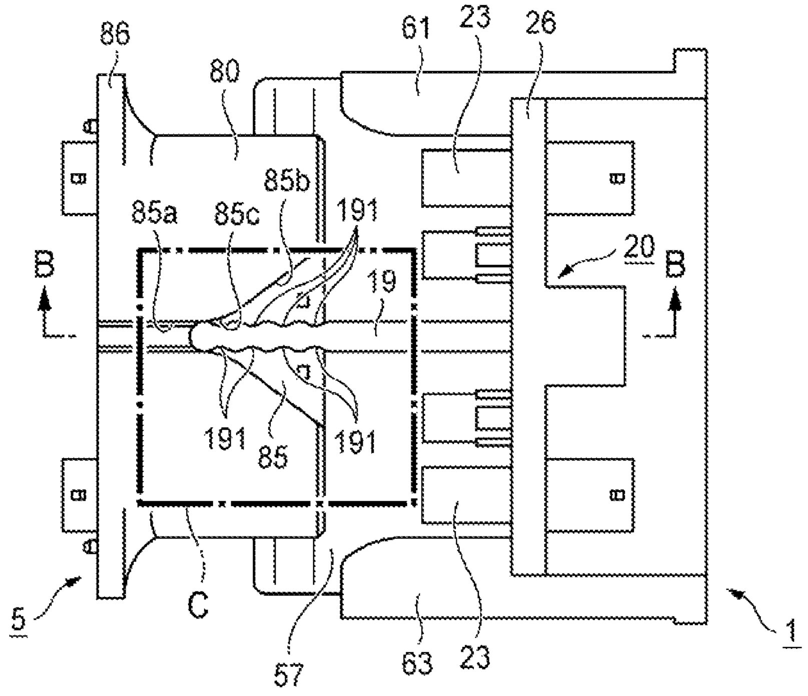
FIG. 5 is a plan view showing a state in which the inlet and the inlet plug shown in FIG. 4 are being fitted to each other.

When the inlet plug 5 is further deeply inserted into the inlet 1 so as to be advanced to the rear side of the inlet 1 from the state shown in FIGS. 4 and 6A, as shown in FIGS. 5 and 6B, the front end of the pick-up rib 19 is guided into the first groove portion 85*a* via the connection portion 85*c* of the fitting guide groove 85. FIG. 1, shows the inlet 1 and the inlet plug 5 in a state in which the inlet 1 and the inlet plug 5 are being fitted to each other.

On the other hand, when the inlet plug 5 is obliquely inserted in the left-right direction with respect to the connector fitting direction, the front end of the pick-up rib 19 abuts on groove side surfaces of the second groove portion 85*b* in the fitting guide groove 85 in the state immediately after the start of fitting (see FIG. 4). From this state, when the inlet plug 5 is further deeply inserted so as to be advanced to the rear side of the inlet 1, the front end of the pick-up rib 19 reaches between both groove side surfaces of the connection portion 85*c* as shown in FIG. 7 while the side surfaces of the pick-up rib 19 are in sliding contact with the groove side surfaces of the second groove portion 85*b* of the fitting guide groove 85.

Figure 7:
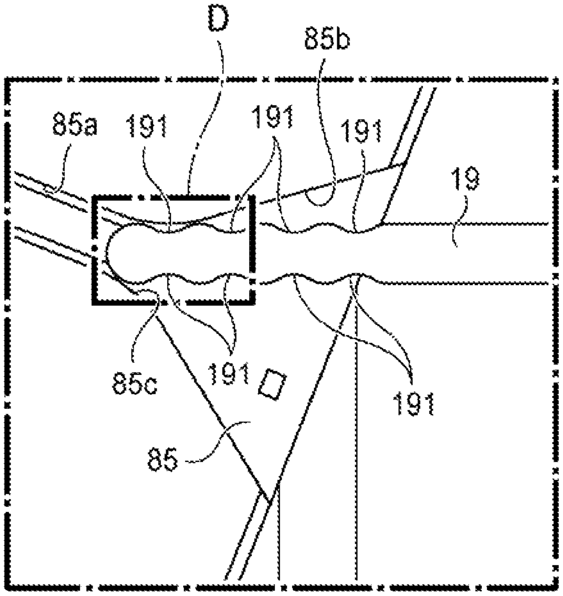
FIG. 7 is an enlarged view of a portion C in FIG. 5, and shows a state in which a projection portion is obliquely inserted into a guide groove.

When the inlet plug 5 is further deeply inserted into the inlet 1 so as to be advanced to the rear side of the inlet 1 from the state shown in FIG. 7, the pick-up rib 19 is inserted between both groove side surfaces of the first groove portion 85*a* in the fitting guide groove 85. When the pick-up rib 19 enters the first groove portion 85*a*, the plug housing 80 is fitted and guided to the housing 20 while the inclined fitting direction is corrected to the correct connector fitting direction.

Figure 9:
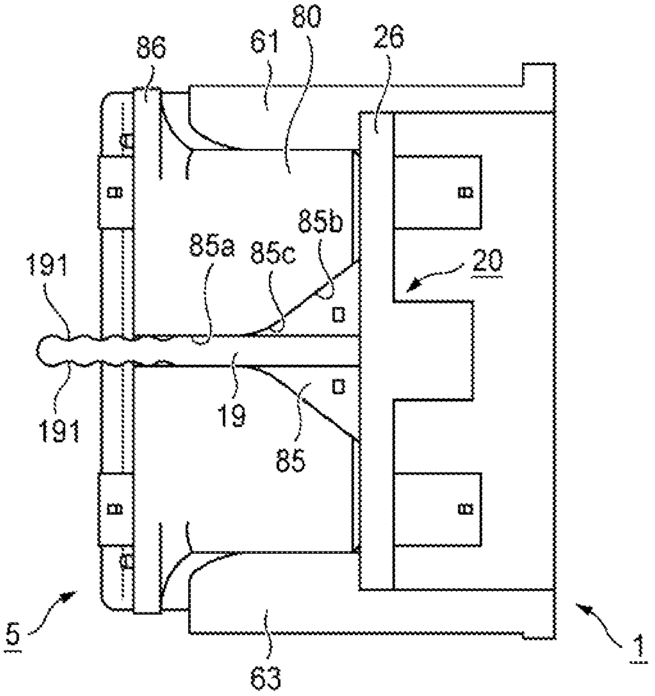
FIG. 9 is a plan view showing a state in which the inlet and the inlet plug shown in FIG. 5 are completely fitted to each other.

Then, when the inlet plug 5 is further deeply inserted into the inlet 1 so as to be advanced to the rear side of the inlet 1, as shown in FIG. 9, the front end of the plug housing 80 abuts against the front wall 26 of the housing 20. In the state of FIG. 9, the connection terminal 90 of the inlet plug 5 is fitted and connected to the connection terminal of the inlet 1, and accordingly, the high-voltage cable on the inlet 1 side and the plug-side high-voltage cable are electrically connected.

Figure 8:
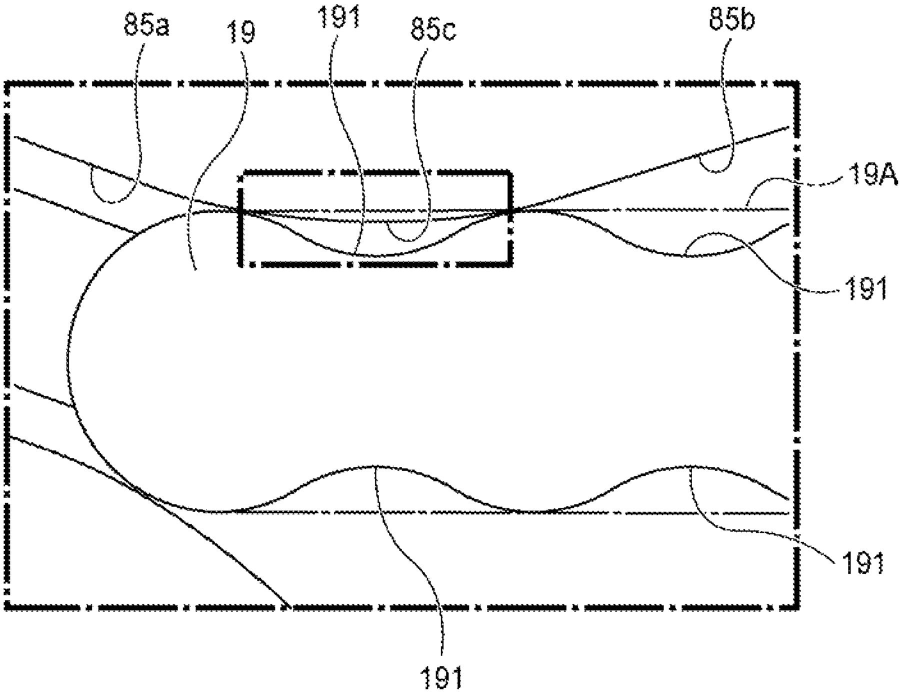
FIG. 8 is an enlarged view of a portion D in FIG. 7.

Here, with reference to FIG. 8, a shape of the pick-up rib 19 of the present embodiment and a shape of a pick-up rib 19A of the reference example will be compared. In FIG. 8, the shape of the pick-up rib 19 is indicated by a solid line, and the shape of the pick-up rib 19A is indicated by an alternate long and short dash line. The pick-up rib 19A of the reference example has a shape in which the recessed portion 191 is not provided in the pick-up rib 19 of the present embodiment. Since the pick-up rib 19A of the reference example interferes with the groove side surfaces of the connection portion 85*c* at a position indicated by a rectangular frame in FIG. 8, the pick-up rib 19A is caught when the inlet plug 5 is inserted into the inlet 1. On the other hand, since the pick-up rib 19 of the embodiment does not interfere with the connection portion 85*c*, the pick-up rib 19 does not catch the connection portion 85*c*.

As described above, according to the connector fitting structure of the inlet 1 and the inlet plug 5 of the present embodiment, the recessed portions 191 are formed in the side surfaces of the pick-up rib 19. With this configuration, even when the pick-up rib 19 is obliquely inserted into the fitting guide groove 85, interference between the pick-up rib 19 and the connection portion 85*c* is avoided by the recessed portions 191, and the pick-up rib 19 and the connection portion 85*c* are not caught by each other. Therefore, the inlet 1 and the inlet plug 5 can be smoothly fitted to each other. Therefore, the connector fitting structure of the present embodiment is particularly useful when the inlet 1 and the inlet plug 5 are fitted to each other automatically or semi-automatically. In addition, since the plurality of recessed portions 191 are formed on one side surface of the pick-up rib 19, even when an approach angle of the pick-up rib 19 is changed, interference with the connection portion 85*c* can be avoided in any of the recessed portions 191.

The present disclosure is not limited to the embodiments described above, and modifications, improvements, and the like can be made as appropriate. In addition, materials, shapes, dimensions, numbers, arrangement positions, and the like of each constituent element in the embodiments described above are optional and not limited as long as the object of the present disclosure can be achieved.

For example, in the above embodiments, although an inlet used for an electric vehicle and the like as a connector has been described as an example, the connector of the present disclosure is not limited thereto, and can be applied to various connectors based on a gist of the present disclosure.

Figure 10:
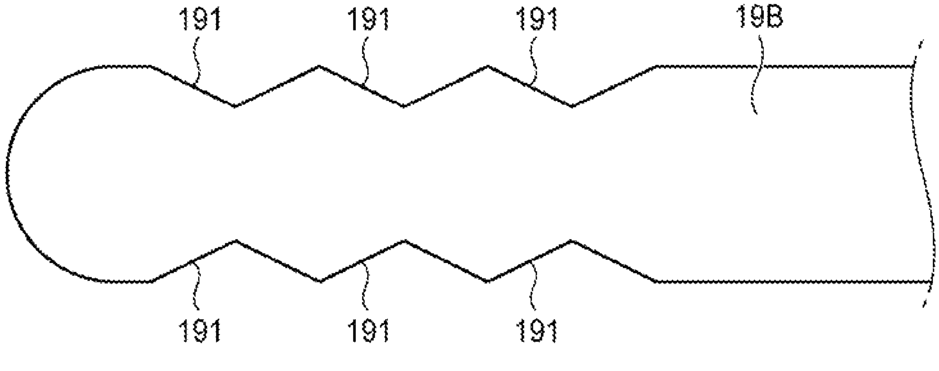
FIG. 10 is a plan view showing a modification of a pick-up rib.

In addition, in the above embodiment, although the plurality of recessed portions 191 are provided in both the side surfaces of the pick-up rib 19, at least one recessed portion 191 may be provided on the from end side of at least one side surface of the pick-up rib 19. Further, the cross-sectional shape or the shape in the plan view of the recessed portion formed in the pick-up rib 19 is not limited to the curved shape, and may be formed by a bent straight line like the recessed portions 191 provided in a pick-up rib 19B shown in FIG. 10.

Further, in the above embodiment, the pick-up rib 19 in which the recessed portions are formed is provided on the inlet 1, and the fitting guide groove 85 is provided in the inlet plug 5, but the present disclosure is not limited to this configuration. One of two connectors to be fitted to each other may be provided with a projection portion corresponding to a pick-up rib in which a recessed portion is formed, and the other connector may be provided with a guide groove into which the projection portion is inserted.

According to a first aspect of the present disclosure, a connector fitting structure includes: a first connector (inlet plug 5); and a second connector (inlet 1), in which the first connector (5) and the second connector (1) are fitted and electrically connected to each other. The first connector (5) includes: a first housing (plug housing 80) that houses a first connection terminal; and a guide groove (fitting guide groove 85) provided in the first housing (80). The guide groove (85) includes: a first groove portion (85*a*) extending along a connector fitting direction; a second groove portion (85*b*) formed to gradually increase in width from a side of the first groove portion toward a side of the second connector; and a connection portion (85*c*) that connects the first groove portion and the second groove portion. The second connector (1) includes: a second housing (outer case 51) that houses a second connection terminal: and a projection portion (pick-up rib 19) provided on the second housing and inserted into the guide groove. The projection portion (19) has a recessed portion (191) formed on a front end side of the projection portion and on at least one side surface of the projection portion that faces groove side surfaces of the guide groove.

According to the connector having the configuration of the first aspect, since the recessed portion is formed on the side surface of the projection portion, even when the projection portion is obliquely inserted into the guide groove, interference between the projection portion and the connection portion of the guide groove is avoided by the recessed portion, and the projection portion and the connection portion of the guide groove are not caught. Therefore, the first connector and the second connector can be smoothly fitted to each other. The oblique insertion means that the projection portion is inserted into the guide groove while being inclined in a width direction of the guide groove with respect to the connector fitting direction.

According to a second aspect of the present disclosure, the recessed portion (191) may be each formed on both side surfaces of the projection portion (19) that face the groove side surfaces.

According to a third aspect of the present disclosure, the recessed portion (191) may include a plurality of recessed portions (191), and the plurality of recessed portions (191) may be formed in the projection portion for each predetermined interval along the connector fitting direction from the front end side.

According to a fourth aspect of the present disclosure, a cross-sectional shape of the recessed portion taken planarly along a groove bottom surface of the guide groove (85) may have a curved shape.

According to a fifth aspect of the present disclosure, the cross-sectional shape on the at least one side surface of the projection portion (19) may have a sine wave shape.

According to the present disclosure, it is possible to provide a connector fitting structure capable of smoothly inserting and fitting a connector.

What is claimed is:

1. A connector fitting structure, comprising:
- a first connector; and
- a second connector, wherein
- the first connector and the second connector are fitted and electrically connected to each other,
- the first connector includes:
  - a first housing that houses a first connection terminal; and
  - a guide groove provided in the first housing,
- the guide groove includes:
  - a first groove portion extending along a connector fitting direction;
  - a second groove portion formed to gradually increase in width from a side of the first groove portion toward a side of the second connector; and
  - a connection portion that connects the first groove portion and the second groove portion,
- the second connector includes:
  - a second housing that houses a second connection terminal;
  - an outer housing that houses and holds the second housing; and
  - a projection portion provided on the outer housing and inserted into the guide groove, and
- the projection portion has a recessed portion formed on a front end side of the projection portion and on at least one side surface of the projection portion that faces groove side surfaces of the guide groove.

2. The connector fitting structure according to claim 1, wherein
- the recessed portion is each formed on both side surfaces of the projection portion that face the groove side surfaces.

3. The connector fitting structure according to claim 1, wherein
- the recessed portion includes a plurality of recessed portions, and
- the plurality of recessed portions are formed in the projection portion for each predetermined interval along the connector fitting direction from the front end side.

4. The connector fitting structure according to claim 1, wherein
- a cross-sectional shape of the recessed portion taken planarly along a groove bottom surface of the guide groove has a curved shape.

5. The connector fitting structure according to claim 4, wherein
- the cross-sectional shape on the at least one side surface of the projection portion has a sine wave shape.

6. The connector fitting structure according to claim 1, wherein
- the projection portion is positioned above the second connection terminal.

7. The connector fitting structure according to claim 1, wherein the guide groove is positioned above the first connection terminal.

8. The connector fitting structure according to claim 1, wherein
- the outer housing comprises a top plate, side walls, and a bottom plate, and
- the projection portion is disposed on a bottom surface of the top plate of the outer housing.

9. The connector fitting structure according to claim 1, wherein
- the projection portion has a substantially rectangular parallelepiped shape with a rounded front end.

10. The connector fitting structure according to claim 1, wherein
- the second connection terminal is housed in a terminal housing cylinder portion provided on a front wall of the second housing and protruding toward the first connector.

* * * * *